United States Patent
Cui et al.

(10) Patent No.: US 12,367,232 B2
(45) Date of Patent: Jul. 22, 2025

(54) GENERATIVE IMAGE ACQUISITION

(71) Applicant: Microsoft Technology Licensing, LLC, Redmond, WA (US)

(72) Inventors: Dehua Cui, Redmond, WA (US); Albert Joseph Kishan Thambiratnam, Redmond (CN); Lin Su, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 72 days.

(21) Appl. No.: 17/606,862

(22) PCT Filed: Mar. 17, 2020

(86) PCT No.: PCT/US2020/023049
§ 371 (c)(1),
(2) Date: Oct. 27, 2021

(87) PCT Pub. No.: WO2020/236249
PCT Pub. Date: Nov. 26, 2020

(65) Prior Publication Data
US 2022/0207076 A1    Jun. 30, 2022

(30) Foreign Application Priority Data
May 21, 2019   (CN) .......................... 201910422730.3

(51) Int. Cl.
*G06F 16/532*     (2019.01)
*G06F 16/538*     (2019.01)

(52) U.S. Cl.
CPC .......... *G06F 16/532* (2019.01); *G06F 16/538* (2019.01)

(58) Field of Classification Search
CPC ...... G06F 16/532; G06F 16/538; G06F 16/58; G06F 16/9535; G06T 5/50
See application file for complete search history.

(56) References Cited

U.S. PATENT DOCUMENTS 7,610,306 B2   10/2009   Lin et al.
8,762,390 B2    6/2014   Yang et al.
(Continued)

FOREIGN PATENT DOCUMENTS

CN    101479728 A    7/2009
CN    104969223 A   10/2015
(Continued)

OTHER PUBLICATIONS

Dong, et al., "Semantic Image Synthesis via Adversarial Learning", in Proceedings of the IEEE International Conference on Computer Vision, Oct. 22, 2017, pp. 5707-5715.
(Continued)

*Primary Examiner* — Angelica Ruiz
(74) *Attorney, Agent, or Firm* — Schwegman Lundberg & Woessner, P.A.

(57) ABSTRACT

The present disclosure provides method and apparatus for generative image acquisition. A query can be received. A first set of images retrieved according to the query can be obtained. It is can be determined that the first set of images includes a first image that partially satisfies the query. A missing component of the first image compared to the query can be detected. A second set of images based on the first image and the missing component can be generated.

7 Claims, 8 Drawing Sheets

(56) References Cited

U.S. PATENT DOCUMENTS

| | | | |
|---|---|---|---|
| 8,983,941 | B1 | 3/2015 | Murphy-chutorian et al. |
| 9,325,804 | B2 | 4/2016 | Hamilton et al. |
| 9,449,026 | B2* | 9/2016 | Wang ............... G06F 16/532 |
| 10,169,896 | B2* | 1/2019 | Balasubramanian ................... G06F 16/9537 |
| 10,613,726 | B2* | 4/2020 | Cohen ............ G06F 16/90332 |
| 11,563,813 | B1* | 1/2023 | Bhushan ............ G06F 16/213 |
| 2004/0078300 | A1* | 4/2004 | Smith ............. G06Q 30/0601 705/26.1 |
| 2008/0040317 | A1 | 2/2008 | Dettinger et al. |
| 2008/0205756 | A1* | 8/2008 | Kamata ............... G06V 10/50 382/209 |
| 2009/0287655 | A1 | 11/2009 | Bennett |
| 2009/0324100 | A1* | 12/2009 | Kletter ........... G06V 30/18152 382/217 |
| 2010/0211602 | A1 | 8/2010 | Menon et al. |
| 2011/0072048 | A1 | 3/2011 | Hua et al. |
| 2014/0253701 | A1* | 9/2014 | Wexler .................. G06F 1/163 348/62 |
| 2014/0280113 | A1* | 9/2014 | Hohwald ........... G06F 16/5866 707/728 |
| 2015/0169643 | A1 | 6/2015 | Kogan et al. |
| 2015/0363481 | A1* | 12/2015 | Haynes ............... G06Q 10/10 707/748 |
| 2016/0048934 | A1* | 2/2016 | Gross ................. G06V 10/40 705/313 |
| 2016/0379091 | A1* | 12/2016 | Lin .................... G06V 10/776 382/156 |
| 2017/0004383 | A1* | 1/2017 | Lin ..................... G06F 18/22 |
| 2018/0039638 | A1* | 2/2018 | Krivokon ........... G06F 16/3322 |
| 2018/0068474 | A1* | 3/2018 | Mowatt ................. G06F 3/012 |
| 2020/0112705 | A1* | 4/2020 | Yokokawa ............ H04N 23/45 |
| 2020/0184278 | A1* | 6/2020 | Zadeh .................. G06N 3/044 |

FOREIGN PATENT DOCUMENTS

| | | |
|---|---|---|
| CN | 105701767 A | 6/2016 |
| CN | 107533567 A | 1/2018 |

OTHER PUBLICATIONS

Johnson, et al., "Semantic Photo Synthesis", in the Journal of Eurographics, vol. 25, Issue 3, Sep. 2006, 7 Pages.

Nie, et al., "Harvesting Visual Concepts for Image Search with Complex Queries", in Proceedings of the 20th ACM international conference on Multimedia, Oct. 29, 2012, pp. 59-68.

"International Search Report and Written Opinion Issued in PCT Application No. PCT/US20/023049", Mailed Date: May 27, 2020, 13 Pages.

Siddiquie, et al., "Multi-Modal Image Retrieval for Complex Queries using Small Codes", in Proceedings of International Conference on Multimedia Retrieval, Apr. 1, 2014, 8 Pages.

"Office Action Issued in European Patent Application No. 20719256. 8", Mailed Date: Sep. 11, 2023, 7 Pages.

Office Action received in Chinese Application No. 201910422730. 3, mailed on Feb. 4, 2024, 8 pages (English Translation Provided).

Dong, et al., "Semantic Image Synthesis via Adversarial Learning", Proceedings of the IEEE international conference on computer vision, 2017, pp. 5706-5714.

Johnson, et al., "Semantic Photo Synthesis", Computer Graphics Forum, vol. 25, Issue. 3, Dec. 7, 2006, pp. 407-413.

Summons to attend oral proceedings pursuant to Rule 115(1) Received in European Patent Application No. 20719256.8, mailed on Jun. 27, 2024, 08 pages.

Notice of Allowance received in Chinese Application No. 201910422730.3, mailed on Jun. 3, 2024, 04 pages (English Translation Provided).

\* cited by examiner

GENERATIVE IMAGE ACQUISITION

CROSS REFERENCE TO RELATED APPLICATION

This Application is a U.S. National Stage Filing Under 35 U.S.C. 371 of International Patent Application Serial No. PCT/US2020/023049, filed Mar. 17, 2020, and published as WO 2020/236249 A1 on Nov. 26, 2020, which claims priority to Chinese Application No. 2019.10422730.3, filed May 21, 2019, which applications and publication are incorporated herein by reference in their entirety.

BACKGROUND

With the development of computer technology and network technology, people are increasingly acquiring the information they need through the network. Applications such as search engines can help users easily acquire information on the network. For example, a search engine can provide an image search service so that through which a user can acquire a desired image. Specifically, the user may input a query corresponding to the desired image in a search box of the search engine, and the search engine will perform an image search for the query and return a search result containing a plurality of images related to the query for the user to view or download.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure provide method and apparatus for generative image acquisition. A query can be received. A first set of images retrieved according to the query can be obtained. It is can be determined that the first set of images includes a first image that partially satisfies the query. A missing component of the first image compared to the query can be detected. A second set of images can be generated based on the first image and the missing component.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

Figure 1:
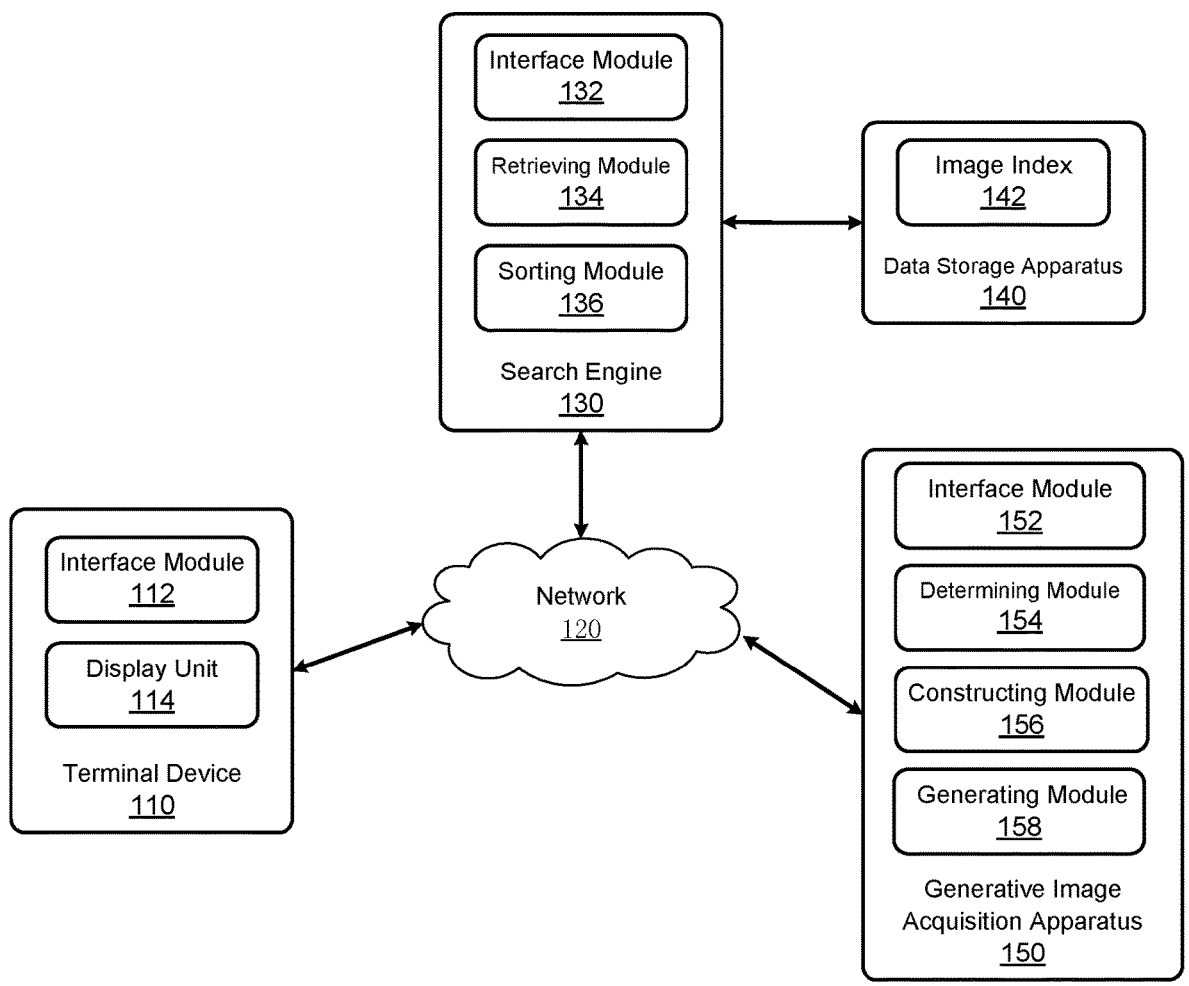
FIG. 1 illustrates an exemplary architecture implementing generative image acquisition in accordance with an embodiment of the present disclosure.

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

In existing image search technologies, if a query is simple, such as when the query includes only one object and/or one attribute associated with the object, a search engine can return a large number of images that satisfy the query. For example, when the query is "white dog", which includes only one object "dog" and its attribute "white", then the search engine can return a large number of images rendering white dogs. However, if the query is complex, such as when the query includes multiple objects and multiple attributes associated with some of the multiple objects, etc., images returned by the search engine may include only a few images that fully satisfy the query, not even images that fully satisfy the query. For example, the query "happy old woman and white dog" includes two objects "woman" and "dog", two attributes "happy" and "old" associated with the object "woman", and an attribute "white" associated with the object "dog". For the query, images returned by the search engine may not include images that fully satisfy the query, that is, images that include the object "woman" with the attributes "happy" and "old", and the object "dog" with the attribute "white".

One reason for this is that existing search engines can only index images that already exist on the network and provide search results accordingly. In the face of complex queries, since there may not be an image on the network that fully satisfies the query or there may be only a very small number of images that fully satisfy the query, the search engine is accordingly unable to provide an image that fully satisfies the query or is difficult to provide a sufficient number of images that fully satisfy the query.

The embodiments of the present disclosure propose to acquire an image by combining both an image search technology and an image generation technology. In response to a query, the embodiments of the present disclosure may not only provide in the image search results images searched on the network, but also provide in the image search results images generated based at least on the query. The embodiments of the present disclosure may employ various image generation technologies, such as deep learning-based image generation models, etc., to generate images based at least on a query.

In one aspect, the embodiments of the present disclosure may first employ an image search technology to obtain some existing images by retrieving according to the query. Then, if it is determined that the retrieved existing images include an image that partially satisfies the query, that is, an image that does not include all the objects involved in the query and the attributes thereof, an image generation technology may be employed to generate images that satisfies the query based on the query. The retrieved existing images and the generated images can be combined into an image search result to be provided to the user. Herein, an object refers to a thing or entity that is included in a query or represented by an image, such as a person, an animal, a plant, a building, etc., and an attribute refers to an essential characteristic of the object, such as shape, color, quantity, and the like.

The embodiments of the present disclosure may generate the images that satisfy the query in a variety of ways.

In an implementation, an existing image obtained using the image search technology can be detected to determine a missing component compared to the query. Herein, a component refers to a semantic element included in a query or represented in an image, which includes an object and/or an attribute associated with the object. For example, a query "happy old woman and white dog" may include two components, that is, a component <happy old woman> and a component <white dog>, wherein the component <happy old woman> may include the object "woman" and two attributes "happy" and "old" associated with the object "woman", and the component <white dog> may include the object "dog" and the attribute "white" associated with the object "dog". After determining the missing component of the existing image, the existing image can be modified based on the missing component, for example, adding the missing component to the existing image to generate an image that satisfies the query.

In another implementation, an existing image obtained using the image search technology can first be detected to determine a missing component compared to the query. A derived query can then be constructed based on the determined missing component and a set of images retrieved from the derived query can be obtained. Herein, a derived query refers to a further query derived from an initial query, which may include one or more of components included in the initial query. In one embodiment, the derived query can be in natural language, such as "red apple and purple grape." In another embodiment, the derived query may be a collection of query terms that the search engine can directly understand, such as "red apple, purple grape." In this embodiment, the derived query may, for example, be specific to the missing component. An image satisfying the query is generated by synthesizing an existing image corresponding to the query and an image in the set of images corresponding to the derived query.

In still another implementation, a plurality of derived queries may be constructed according to the query, and a plurality of sets of sub-images respectively retrieved according to the plurality of derived queries and corresponding to the plurality of derived queries are obtained. An image satisfying the query is generated by synthesizing a plurality of images selected from the plurality of sets of sub-images and respectively corresponding to the plurality of derived queries.

In yet another aspect, the embodiments of the present disclosure can receive a request for modifying one or more images in image search results through a user interface for receiving a query and presenting the image search results, and return the modified images according to the request, without invoking other applications or software. Moreover, image modification requests can be made by using natural language and by interactive means.

Since the embodiments of the present disclosure can provide in the image search results not only existing images searched on the network, but also images generated according to queries, the image search results can be enriched. The generated images can be semantically accurate images that match the query, so it can better adapt to the query and satisfy the user's image query request.

It should be appreciated that although the foregoing discussions and the following discussions relate to examples of implementing generative image acquisition at a search engine, the embodiments of the present disclosure are not limited thereto, but may implement generative image acquisition in any other type of application scenario in a similar manner.

FIG. 1 illustrates an exemplary architecture 100 implementing generative image acquisition in accordance with an embodiment of the present disclosure. In the architecture 100, a terminal device 110 communicates with a search engine 130 via a network 120. The Network 120 may be used to establish connections between various network entities, including, but not limited to, an intranet, the Internet, a local area network, a wide area network, or any other type of network, network combination, or variations thereof.

As shown in FIG. 1, the terminal device 110 may include an interface module 112, a display unit 114, and the like. The interface module 112 can be configured to interact with a user of the terminal device 110, for example, to receive a user's various inputs, including query requests, image modification requests, and the like. The user's inputs may be provided using a natural language approach, for example, the user may input, with voice or text, a query request such as "red apple and purple grape", an image modification request such as "change the background to blue", and the like. Moreover, the interface module 112 may also be configured to communicate with other network entities, such as a search engine 130, via the network 120, for example, sending query requests to the search engine 130, receiving image search results from the search engine 130, and the like. The display unit 114 may be configured to present a visual interface associated with an image search service and various other information to a user of the terminal device 110, for example, presenting a search box in which a user can input the query, presenting image search results, and the like. As shown in FIG. 1, the search engine 130 can include an interface module 132, a retrieving module 134, a sorting module 136, and the like.

The interface module 132 can be configured to communicate with other network entities via the network 120. For example, the interface module 132 can receive queries from the terminal device 110, send image search results to the terminal device 110, and the like. Moreover, the interface module 132 can also interact with a generative image acquisition apparatus 150 in the architecture 100, for example, sending a query to the generative image acquisition apparatus 150, receiving a derived query from the generative image acquisition apparatus 150, and receiving an generated image from the generative image acquisition apparatus 150, and the like.

The retrieving module 134 can be configured to retrieve based on a query received by the interface module 132 to obtain a set of images. In some embodiments, the retrieving module 134 can interact with a data storage apparatus 140 in the architecture 100 via the network 150 to determine the set of images. The data storage apparatus 150 may store various information associated with image searches, such as a plurality of images, image identifiers associated with each image, and the like. An image identifier may be a uniform resource locator (URL) associated with a particular image, an alphanumeric value uniquely assigned to the particular image, and the like. The information associated with the image searches in the data storage apparatus 150 can be organized into an image index 142 for use by the search engine in retrieving images. The retrieving module 134 can query the image index 142 in the data storage apparatus 140 to identify or determine an image that has a certain matching degree with the received query.

The sorting module 136 can be configured to sort the set of images obtained by the retrieving module 134 and the images received by the interface module 132 from the generative image acquisition apparatus 150. In an implementation, the sorting can be based on the matching degree of the query to the image. Herein, a matching degree refers to the extent to which a image satisfies a query. The sorting module 136 can provide at least a portion of the sorted images to the interface module 132 for returning to the terminal device 110 as image search results.

In accordance with an embodiment of the present disclosure, the architecture 100 may further include a generative image acquisition apparatus 150 for generating an image based, at least in part, on a user's query. As shown in FIG. 1, the generative image acquisition apparatus 150 may include an interface module 152, a determining module 154, a constructing module 156, a generating module 158, and the like.

The interface module 152 can be configured to interact with the search engine 130 via the network 120. For example, the interface module 152 can receive, from the interface module 132 of the search engine 130, queries from the terminal device 110, images retrieved by the retrieving module 134, etc., and send, to the search engine 130, derived queries, generated images, etc.

The determining module 154 can determine whether an image partially satisfies a query corresponding to the image. In some implementations, the determining module 154 can receive a query from the interface module 152 or receive a derived query from the constructing module 156. Moreover, the determining module 154 can also receive images retrieved by the search engine 130 according to the query from the interface module 152, or can receive images generated based on the query from the generating module 158.

The determining module 154 can obtain a set of components corresponding to the query by detecting the query, for example, by detecting text content contained in the query. Each component of the set of components can include an object and/or an attribute associated with the object. For example, a set of components corresponding to a query "red apple and purple grape" may be <red apple, purple grape>, wherein a component <red apple> may include an object "apple" and an attribute "red" associated with the object, and a component <purple grape> may include an object "grape" and an attribute "purple" associated with the object.

Moreover, the determining module 154 can also obtain a set of components corresponding to a image by detecting the image, for example, by detecting visual content presented in the image. Each component of the set of components can also include an object and/or an attribute associated with the object. For example, components corresponding to an image rendering a yellow apple and a purple grape may be <yellow apple, purple grape>, wherein a component <yellow apple> may include an object "apple" and an attribute "yellow" associated with the object, and a component <purple grape> may include an object "grape" and an attribute "purple" associated with the object.

The determining module 154 can determine whether the set of components corresponding to the image includes all of the components of the set of components corresponding to the query. If the set of components corresponding to the image does not include all of the components of the set of components corresponding to the query, it may be determined that the image partially satisfies the query. For example, the above set of components corresponding to the image rendering the yellow apple and the purple grape does not include all of the components in the set of components corresponding to the query "red apple and purple grape", so the image partially satisfies the query. It should be appreciated that, herein, "an image partially satisfying a query" may also be referred to as "an image not satisfying a query", "an image not fully satisfying a query", and the like.

When an image partially satisfies a query corresponding to the image, the determining module 154 can also be configured to determine a missing component of the image compared to the query corresponding to the image. Continuing with the above example, in the case where it is determined that the image rendering the yellow apple and the purple grape partially satisfies the query "red apple and purple grape", the determining module 154 can also determine a missing component of the image rendering the yellow apple and the purple grape compared to the query "red apple and purple grape". In this example, the determined missing component may be <red apple>. The determined missing component can be further provided to the constructing module 156.

The constructing module 156 can be configured to construct a derived query based on the query. In an implementation, the constructing module 156 can construct the derived query based on the missing component determined by the determining module 154. For example, if the determined missing component is <red apple>, the constructing module can construct a derived query with a component <red apple>. In another implementation, the constructing module 156 can also construct a plurality of derived queries by decomposing components in an initial query. For example, if the initial query is "red apple and purple grape", the constructing module 156 can decompose the initial query into a component <red apple> and a component <purple grape>, and construct a derived query "red apple" and a derived query "purple grape", respectively. The derived queries constructed by the constructing module 156 can be provided to the retrieving module 134 of the search engine 130 for further retrieval.

The generating module 158 can be configured to generate an image based on a query.

In one aspect, the generating module 158 can be configured to modify an image. In an implementation, the generating module 158 can modify an image based on a missing component of the image compared to a query corresponding to the image. For example, for a query "a red bird with big eyes", a set of images retrieved according to the query can be obtained. This set of images may include some images rendering a red bird and some images rendering a bird with big eyes. The generating module 158 can modify the eyes of the bird in an image rendering a red bird to generate an image rendering a red bird with big eyes. Moreover, for an image rendering a bird with big eyes, the generating module 158 can modify the color of the bird in the image to red to generate an image rendering a red bird with big eyes. In another implementation, the generating module 158 can modify a particular image based on an input received from the user for modifying the particular image.

In another aspect, the generating module 158 can also be configured to synthesize a plurality of images. In accordance with an embodiment of the present disclosure, the generating module 158 may synthesize an image based at least on a relationship or relative position between the objects that is indicated by the query. For example, for a query "kitten on a sofa", an image rendering a sofa and an image rendering a kitten can be obtained. The generating module 158 can synthesize the two images based at least on the relative position between the object "sofa" and the object "kitten" that is indicated by the query, that is, the kitten is on the sofa, to generate an image rendering the kitten on the sofa.

Figure 2:
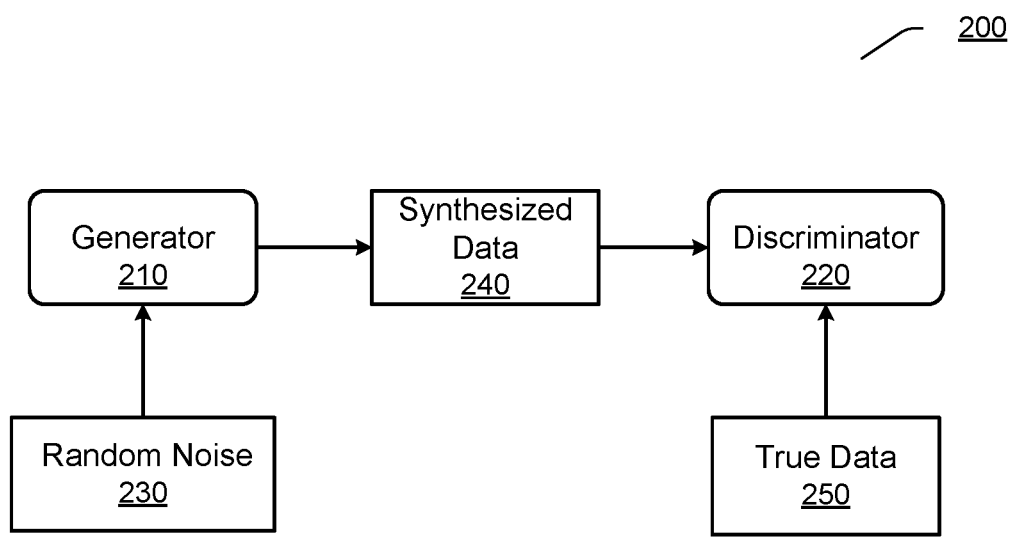
FIG. 2 illustrates an exemplary structure of a Generative Adversarial Network (GAN).

In some embodiments, the generating module 158 can employ a deep learning-based image generation model, such as a Generative Adversarial Network (GAN), a Glow Generation Model, a Variational Auto-Encoder (VAE), and the like. These image generation models are modeled based on concepts of deep learning, and are capable of generating high fidelity images. FIG. 2 illustrates an exemplary structure 200 of a GAN. It should be appreciated that although the following discussions involve an example of generating an image using GAN, the embodiments of the present disclosure are not limited thereto, but other image generation technologies or other image generation models may be utilized to generate images in a similar manner. As shown in FIG. 2, the GAN can include two separate neural networks: a generator 210 and a discriminator 220. The generator 210 adopts random noise 230 as an input and outputs synthesized data 240. The discriminator 220 adopts true data 250 and the synthesized data 240 output by the generator 210 as inputs, and outputs a two-class discrimination to a source of an input, that is, "true" indicates that the input originates from the true data 250, and "false" indicates that the input originates from the synthesized data 240 output by the generator. The purpose of the generator 210 is to try to learn true data distribution, and the purpose of the discriminator 220 is to try to correctly discriminate whether the input is from the true data or from the generator. These two opposing and iteratively optimized processes cause the performance of the generator and the discriminator to be continually improved. When finally the discriminating ability of the discriminator is improved so that the source of data cannot be correctly discriminated, it can be considered that the generator has learned the true data distribution. The image generation model can be built according to the structure of the GAN shown in FIG. 2 and deployed in the generating module 158. The image generation model can be trained to implement the various image generating functions performed by the generating module 158 involved in the previous discussions and the following discussions.

It should be appreciated that the architecture 100 shown in FIG. 1 is merely one example of implementing the generative image acquisition. Depending on actual application requirements, the architecture implementing the generative image acquisition may have any other structure and may include more or fewer elements. For example, although in the architecture 100 shown in FIG. 1, the data storage apparatus 140 and the generative image acquisition apparatus 150 are illustrated as separate entities, in some embodiments, the data storage apparatus 140 and/or the generative image acquisition apparatus 150 can also be integrated into the search engine 130. Moreover, although in the architecture 100 shown in FIG. 1, the data storage apparatus 140 is shown as being directly connected to the search engine 130, in some embodiments, the data storage apparatus 140 can also be connected to the search engine 130 via the network 120.

Figure 3:
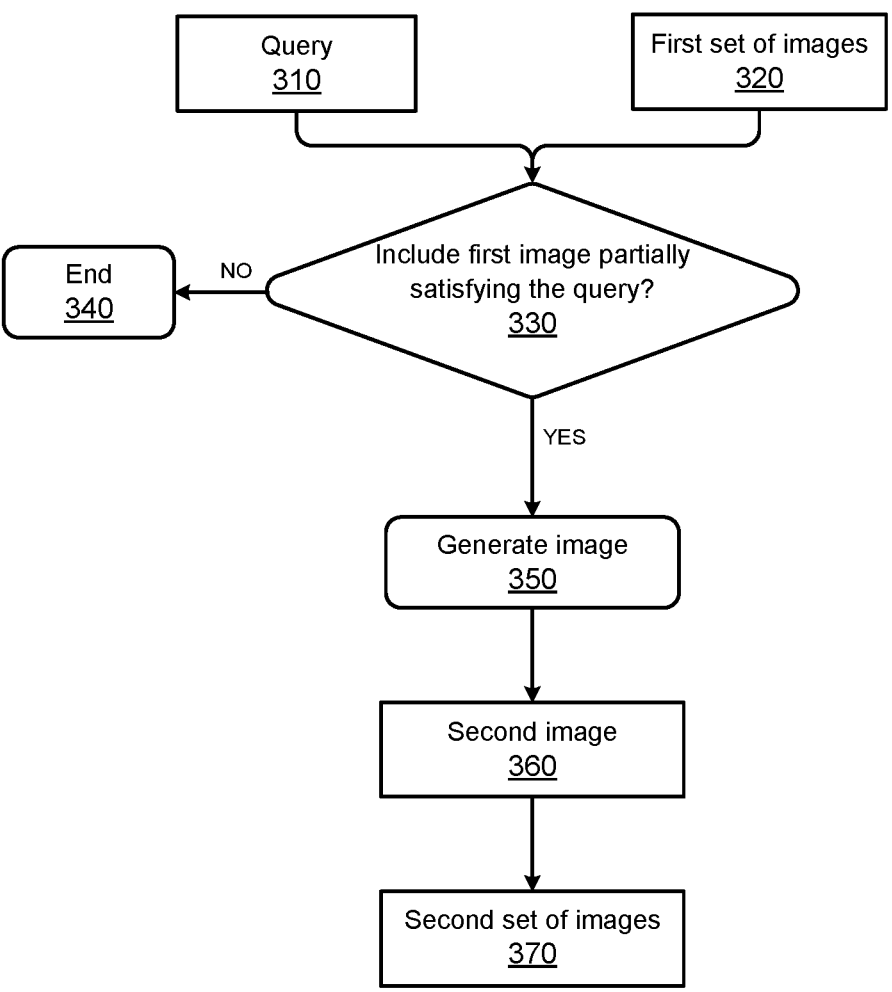
FIG. 3 illustrates an exemplary process for generative image acquisition in accordance with an embodiment of the present disclosure.

FIG. 3 illustrates an exemplary process 300 for generative image acquisition in accordance with an embodiment of the present disclosure. In some embodiments, the process 300 can be performed using the generative image acquisition apparatus 140 shown in FIG. 1.

Firstly, a query 310 for an image can be received and a first set of images 320 retrieved according to the query 310 can be obtained. In some embodiments, the query 310 and the first set of images 320 can be obtained from the search engine using the interface module 152 in the generative image acquisition apparatus 150 shown in FIG. 1, wherein the first set of images 320 may be retrieved by the search engine based on the query 310.

At 330, it can be determined whether the first set of images 320 includes a first image that partially satisfies the query 310. In some embodiments, the determining module 154 in the generative image acquisition apparatus 150 shown in FIG. 1 can be used to make the determination If the first set of images 320 does not include the first image that partially satisfies the query 310, the process 300 ends at 340.

If the first set of images 320 includes the first image that partially satisfies the query 310, at 350, a second image 360 can be generated based at least on the query 310. Since the second image 360 is generated based at least on the query 310, the second image 360 will have a higher matching degree with the query 310 or fully satisfy the query 310.

The second image 360 can be added to the second set of images 370. In one embodiment, a plurality of first images partially satisfying the query 310 may be determined at 330, such that a plurality of second images may be generated accordingly, and the generated plurality of second images are added to the second set of images 370. The second set of images 370 can then be returned to the search engine for providing image search results to the user.

The embodiments of the present disclosure propose various methods for generating an image based on a query. The various methods are performed in response to determining that a first set of images retrieved according to the query comprises a first image that partially satisfies the query. In an implementation, a second image may be generated by modifying the first image based on a missing component of the first image compared to the query. In another implementation, the second image can be generated by constructing a derived query based a missing component of the first image compared to the query, obtaining an additional image retrieved according to the derived query, and synthesizing the first image and the additional image. In still another implementation, an image satisfying the query can be generated by constructing a plurality of derived queries according to the query, obtaining a plurality of sets of sub-images respectively retrieved according to the plurality of derived queries and respectively corresponding to the plurality of derived queries, and synthesizing a plurality of images selected from the plurality of sets of sub-images and respectively corresponding to the plurality of derived queries.

Figure 4:
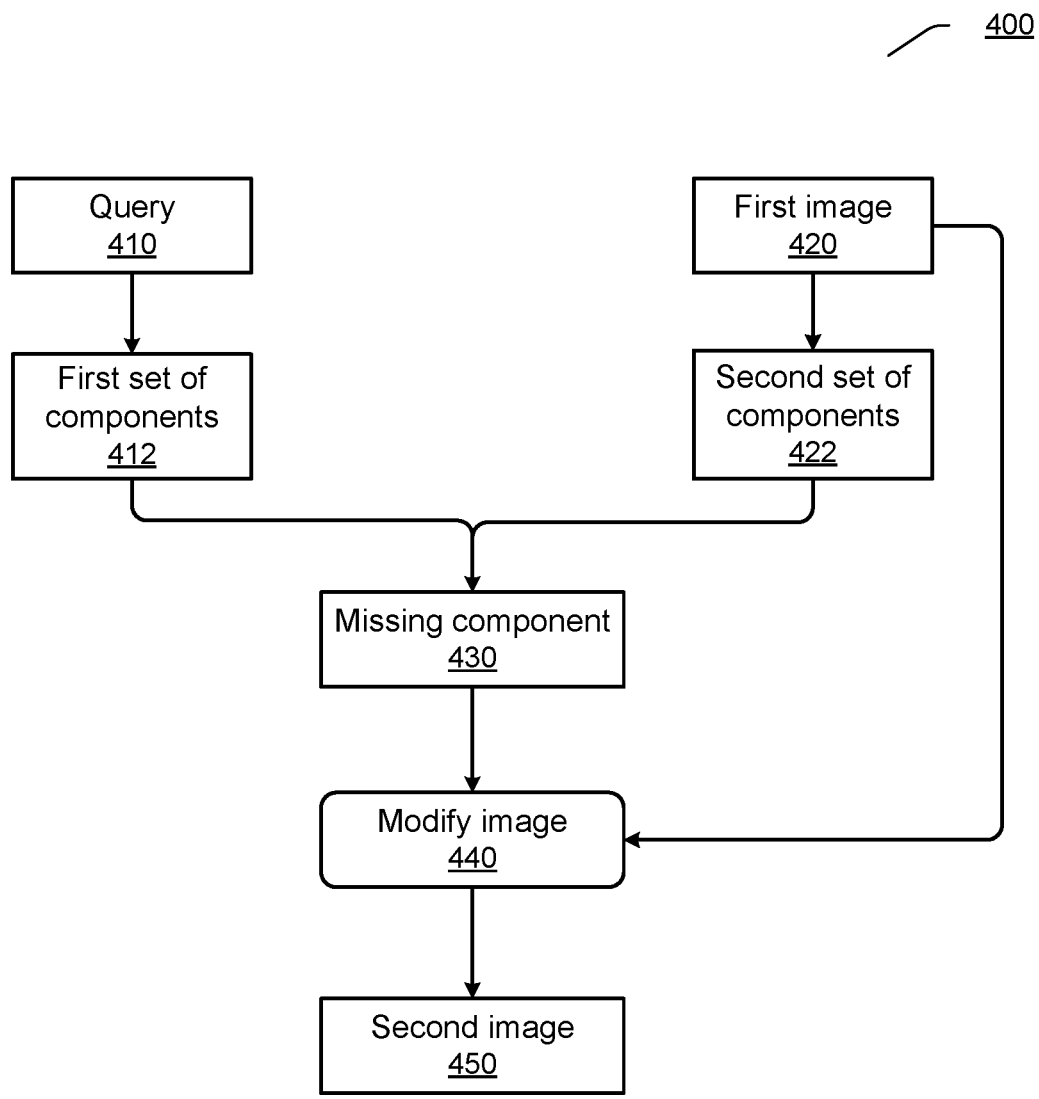
FIG. 4 illustrates a first exemplary process for generating an image based on a query in accordance with an embodiment of the present disclosure.

FIG. 4 illustrates a first exemplary process 400 for generating an image based on a query in accordance with an embodiment of the present disclosure. The process 400 can generate a second image by modifying a first image based on a missing component of the first image, retrieved according to the query, compared to the query. The process 400 can be performed by the generative image acquisition apparatus 150 shown in FIG. 1, and can correspond to the operation 350 in FIG. 3.

A query 410 and a first image 420 can be obtained, wherein the first image 420 partially satisfies the query 410. The query 410 can correspond to the query 310 in FIG. 3. For example, the query 410 can be "red apple and purple grape." The first image 420 may correspond to the first image that partially satisfies the query 310 in the first set of images 320 in FIG. 3. For example, the first image 420 that partially satisfies the query 410 "red apple and purple grape" may be an image rendering a yellow apple and a purple grape. It should be appreciated that although the query involves two components in this example, and each component has only one attribute associated therewith, the embodiments of the present disclosure are not limited thereto, but may be applied to, in a similar manner, a query that includes more or less components or each component has more or fewer attributes associated therewith.

A first set of components 412 corresponding to the query 410 can be obtained by detecting the query 410. For example, the first set of components 412 corresponding to the query 410 "red apple and purple grape" may be <red apple, purple grape>. Moreover, a second set of components 422 corresponding to the first image 420 can also be obtained by detecting the first image 420. For example, the second set of components 422 corresponding to the first image 420 rendering a yellow apple and a purple grape may be <yellow apple, purple grape>. In some embodiments, the determining module 154 in the generative image acquisition apparatus 150 shown in FIG. 1 can be used to perform this detection.

A missing component 430 of the second set of components 422 corresponding to the first image 420 compared to the first set of components 412 corresponding to the query 410 can be obtained by comparing the first set of components 412 with the second set of components 422. Continuing with the above example, the missing component 430 of the second set of components 422<yellow apple, purple grape> compared to the first set of components 412<red apple, purple grape> may be <red apple>. In some embodiments, the determining module 154 in the generative image acquisition apparatus 150 shown in FIG. 1 can be used to obtain the missing component 430.

At 440, a second image 450 can be generated by modifying the first image 420 based on the missing component 430. The second image 450 can correspond to the second image 360 in FIG. 3. Continuing with the above example, the first image 420 rendering the yellow apple and the purple grape can be modified based on the missing component 430 <red apple> to generate the second image 450 rendering the red and the purple grape. In some embodiments, the generating module 158 in the generative image acquisition apparatus 150 shown in FIG. 1 can be used to modify the first image 420. In an implementation, the component <yellow apple> not included in the query 410 may be removed from the first image 420, and a generated image element corresponding to the missing component 430<red apple> is added to the first image 420, thereby obtaining the second image 450. In another embodiment, it may be determined that the object of the component <yellow apple> in the first image 420 is the same as the object of the missing component 430<red apple> but only the attributes are different, and the second image 450 can be obtained by modifying the attribute <yellow> in the component <yellow apple> of the first image 420 to <red> to produce an image element corresponding to red apple.

Figure 5:
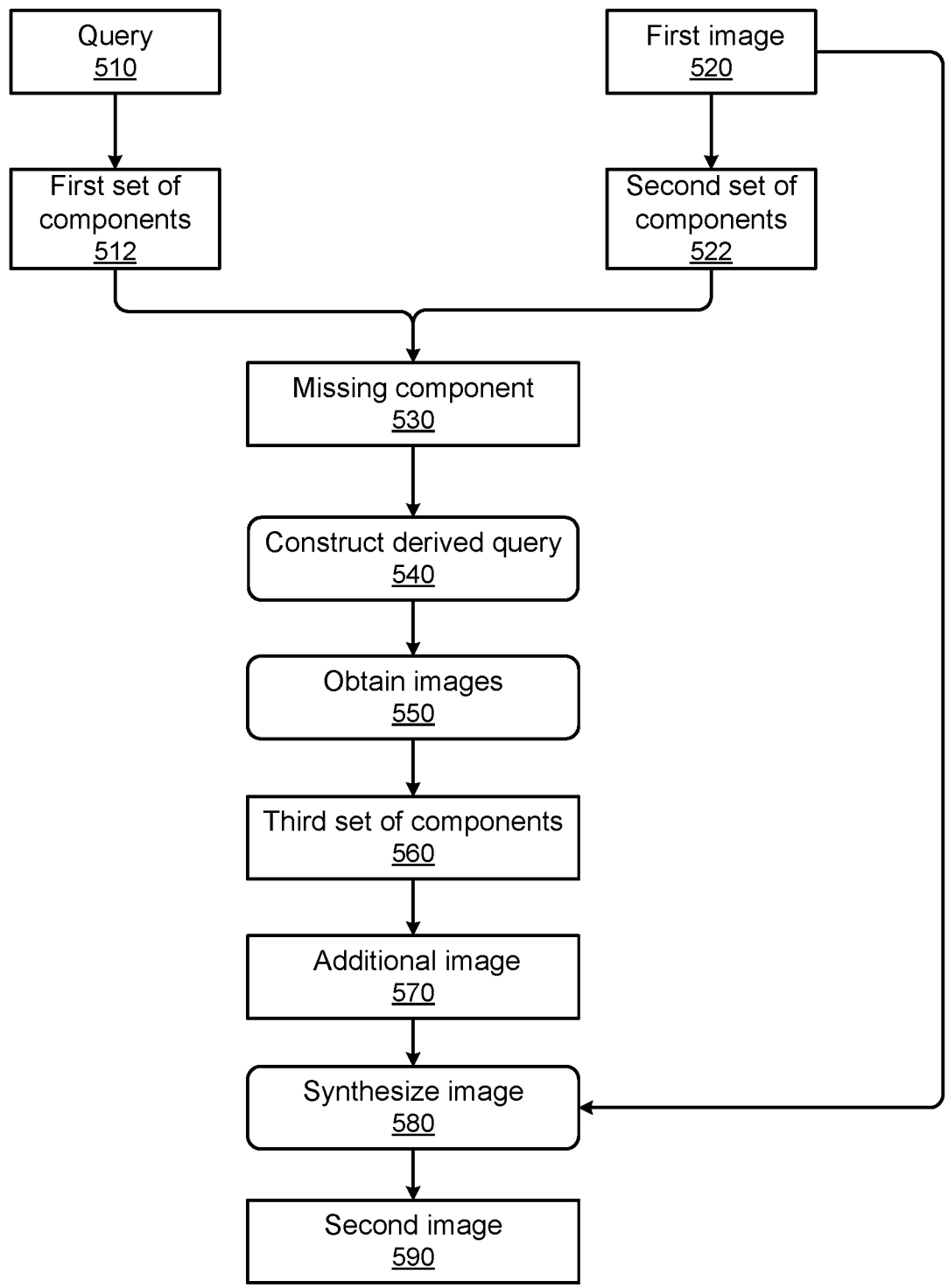
FIG. 5 illustrates a second exemplary process for generating an image based on a query in accordance with an embodiment of the present disclosure.

FIG. 5 illustrates a second exemplary process 500 for generating an image based on a query in accordance with an embodiment of the present disclosure. The process 500 can generate a second image by constructing a derived query based on a missing component of a first image retrieved according to an initial query compared to the initial query, obtaining an additional image retrieved according to the derived query, and synthesizing the first image and the additional image. The process 500 can be performed by the generative image acquisition apparatus 150 shown in FIG. 1, and can correspond to the operation 350 in FIG. 3.

A query 510 and a first image 520 can be obtained, wherein the query 510 is an initial query provided by the user, and the first image 520 partially satisfies the query 510. The query 510 can correspond to the query 310 in FIG. 3. For example, the query 510 can be "red apple and purple grape." The first image 520 may correspond to the first image that partially satisfies the query 310 in the first set of images 320 in FIG. 3. For example, the first image 520 can be an image rendering a purple grape. It should be appreciated that although the query involves two components in this example, and each component has only one attribute associated therewith, the embodiments of the present disclosure are not limited thereto, but may be applied to, in a similar manner, a query that includes more or less components or each component has more or fewer attributes associated therewith.

A first set of components 512 corresponding to the query 510 can be obtained by detecting the query 510. For example, the first set of components 512 corresponding to the query 510 "red apple and purple grape" may be <red apple, purple grape>. Moreover, a second set of components 522 corresponding to the first image 520 can also be obtained by detecting the first image 520. For example, the second set of components 522 corresponding to the first image 520 rendering the purple grape may be <purple grape>. In some embodiments, the determining module 154 in the generative image acquisition apparatus 150 shown in FIG. 1 can be used to perform this detection.

A missing component 530 of the second set of components 522 corresponding to the first image 520 compared to the first set of components 512 corresponding to the query 510 can be obtained by comparing the first set of components 512 with the second set of components 522. Continuing with the above example, the missing component 530 of the second set of components 522<purple grape> compared to the first set of components 512 <red apple, purple grape> may be <red apple>. In some embodiments, the determining module 154 in the generative image acquisition apparatus 150 shown in FIG. 1 can be used to obtain the missing component 530.

At 540, a derived query can be constructed based on the missing component 530. For example, the derived query "red apple" can be constructed based on the missing component 530<red apple>.

At 550, a third set of images 560 retrieved according to the constructed derived query can be obtained. For example, the third set of images 560 retrieved according to the derived query "red apple" may include images rendering the red apple, images rendering the yellow apple, images rendering the green apple, and the like. The third set of images 560 can be retrieved by the search engine based on the derived query.

An additional image 570 can be selected from the third set of images 560. In accordance with an embodiment of the present disclosure, the selected additional image 570 may be an image, selected from the third set of images 560, whose matching degree with the derived query satisfies the matching degree threshold. The matching degree threshold may be pre-set based on experience. For example, the selected additional image 570 may be an image rendering the red apple that fully satisfies the derived query "red apple."

At 580, the first image 520 and the additional image 580 can be synthesized into a second image 590. The second image 590 can correspond to the second image 360 in FIG. 3. For example, an additional image 580 rendering the red apple and a first image 520 rendering the purple grape may be synthesized to generate a second image 590 rendering the red apple and the purple grape.

In accordance with an embodiment of the present disclosure, naturalness of the second image 590 can also be determined. Herein, naturalness refers to a confidence level used to evaluate whether an image is natural. For example, for a query "mobile phone and table", if a generated image is a mobile phone standing on a table, the image is considered unnatural. If the naturalness of the second image 590 does not satisfy the naturalness threshold, the second image is removed. The naturalness threshold may be pre-set based on experience.

In accordance with an embodiment of the present disclosure, after the second image is generated by the process 400 as shown in FIG. 4 or the process 500 as shown in FIG. 5, it may further be determined whether the generated second image 450/590 satisfies the query 410/510. In the case that the second image partially satisfies the query, the second image can be updated based at least on the query.

In an implementation, the second image can be updated by a process similar to the process 400 shown in FIG. 4. Specifically, a set of components corresponding to the second image can be obtained by detecting the second image. This set of components can be compared to the first set of components corresponding to the query to obtain the missing component. An updated second image can then be generated by modifying the second image based on the missing component.

In another implementation, the second image can be updated by a process similar to the process 500 shown in FIG. 5. Specifically, a set of components corresponding to the second image can be obtained by detecting the second image. This set of components can be compared to the first set of components corresponding to the query to obtain the missing component. A derived query can then be constructed based on the missing component and a set of images retrieved according to the constructed derived query can be obtained. An additional image may be selected from the set of images, and an updated second image may be generated by synthesizing the second image with the selected additional image.

It should be appreciated that the process 400 as shown in FIG. 4 or the process 500 as shown in FIG. 5 may be performed iteratively until the generated second image satisfies the query or other stop conditions of the system are reached, the other stop conditions may be, for example, that a number of images satisfying the query among the first set of images retrieved according to the query and the second set of images generated based on the query has satisfied a predetermined threshold, or the like.

Figure 6:
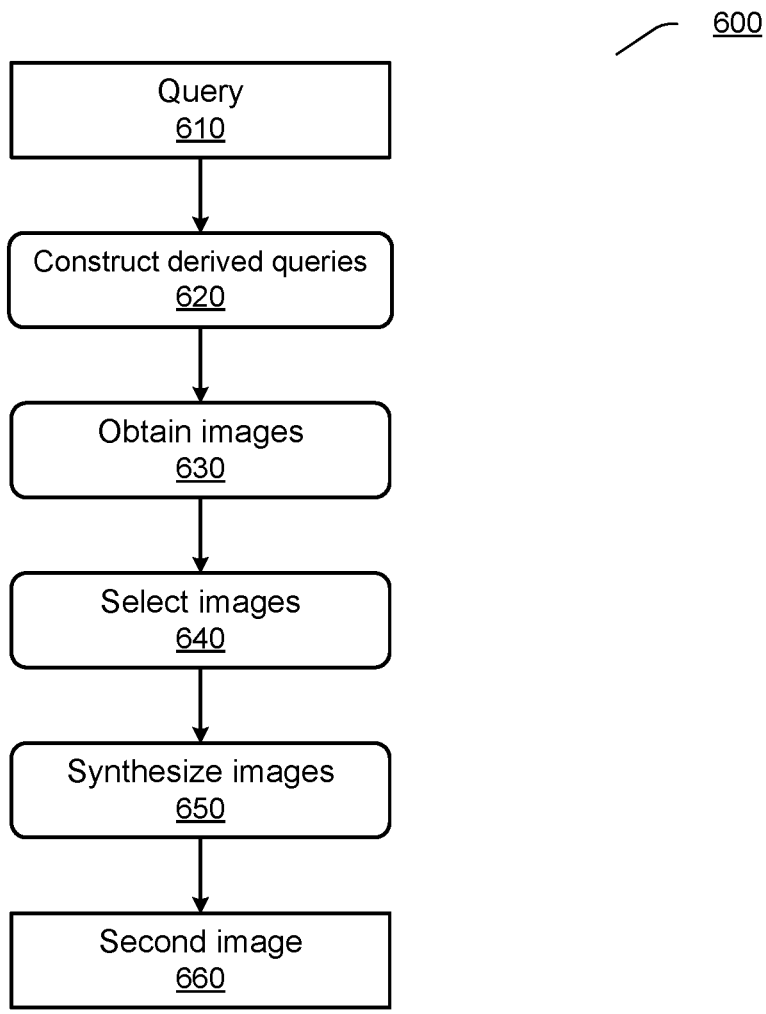
FIG. 6 illustrates a third exemplary process for generating an image based on a query in accordance with an embodiment of the present disclosure.

FIG. 6 illustrates a third exemplary process 600 for generating an image based on a query in accordance with an embodiment of the present disclosure. In the process 600, an image satisfying the query can be generated by constructing a plurality of derived queries according to the query, obtaining a plurality of sets of sub-images respectively retrieved according to the plurality of derived queries and respectively corresponding to the plurality of derived queries, and synthesizing a plurality of images selected from the plurality of sets of sub-images and respectively corresponding to the plurality of derived queries. The process 600 can be performed by the generative image acquisition apparatus 150 shown in FIG. 1, and can correspond to the operation 350 in FIG. 3.

A query 610 can be obtained. For example, the query 610 can be "red apple, purple grape and banana." The query 610 can correspond to the query 310 in FIG. 3. It should be appreciated that although the query involves three components in this example, and each component has at most one attribute associated therewith, the embodiments of the present disclosure are not limited thereto, but may be applied to, in a similar manner, a query that includes more or less components or each component has more or fewer attributes associated therewith.

At 620, a plurality of derived queries can be constructed based on the query 610. In one embodiment, a set of components included in query 610 may be detected firstly. The set of components can then be decomposed into a plurality of component subsets. A plurality of derived queries can then be constructed based on the plurality of component subsets decomposed. The plurality of derived queries constructed may include one or more of the components corresponding to the query 610, respectively. For example, for the query 610 "red apple, purple grape, and banana", a set of components <red apple, purple grape, banana> can be detected firstly. The set of components can then be decomposed into two component subsets, such as a first component subset <red apple> and a second component subset <purple grape, banana>. Two derived queries can then be constructed based on these two component subsets, such as a first derived query "red apple" and a second derived query "purple grape and banana".

At 630, a plurality of sets of sub-images respectively retrieved according to the plurality of derived queries and respectively corresponding to the plurality of derived queries can be obtained. The plurality of sets of sub-images may be separately retrieved by the search engine based on the plurality of derived queries. For example, a first set of sub-images retrieved according to the first derived query "red apple" can be obtained. The first set of sub-images may, for example, include sub-images rendering the red apple, sub-images rendering the yellow apple, and the like. Moreover, a second set of sub-images retrieved according to the second derived query "purple grape and banana" can be obtained. The second set of sub-images may, for example, include sub-images rendering the purple grape and the banana, sub-images rendering the banana, sub-images rendering the purple grape, and the like.

At 640, a plurality of sub-images respectively corresponding to the plurality of derived queries can be selected from the plurality of sets of sub-images obtained. In an implementation, for each set of sub-images among the plurality of sets of sub-images, a sub-image satisfying a derived query corresponding to the set of sub-images can be selected. For example, one sub-image having the highest matching degree with a first derived query "red apple" may be selected from the first set of sub-images, such as a first sub-image rendering the red apple. Moreover, one sub-image having the highest matching degree with a second derived query "purple grape and banana" may also be selected from the second set of sub-images, such as a second sub-image rendering the purple grape and the banana.

At 650, the selected plurality of sub-images can be combined into a second image 660. The second image 660 can correspond to the second image 360 of FIG. 3. For example, the first sub-image rendering the red apple and the second sub-image rendering the purple grape and the banana can be synthesized to generate the second image rendering the red apple, the purple grape, and the banana.

In accordance with an embodiment of the present disclosure, if the set of sub-images retrieved according to the constructed derived query does not include an image satisfying the derived query, further operations can be performed to obtain additional sub-images.

In an implementation, an attribute in a component included in the derived query may be determined, and at least one image in the set of sub-images is modified based on the attribute to generate at least one updated sub-image satisfying the derived query. For example, for a derived query "red apple", a set of sub-images retrieved according to the derived query may not include an image rendering the red apple, for example, the set of sub-images may only include images rendering the green apple and images rendering the yellow apple. The attribute in the component included in the derived query "red apple" can be determined, that is, "red". An image rendering the green apple or an image rendering the yellow apple in the set of sub-images may then be modified based on the attribute "red" to generate an image rendering the red apple.

A derived query constructed according to a query can include one or more components. In the case that the derived query includes a plurality of components, when it is determined that the set of sub-images retrieved according to the derived query does not include an image satisfying the derived query, according to another implementation of the present disclosure, a plurality of components included in the derived query may also be determined, and a plurality of decomposed derived queries may be constructed according to the plurality of components. For example, the plurality of components in the derived query can be further decomposed into a plurality of component subsets, and a plurality of decomposed derived queries are constructed based on the plurality of component subsets. Subsequently, a plurality of sets of additional sub-images respectively retrieved according to the plurality of decomposed derived queries and respectively corresponding to the plurality of decomposed derived queries can be obtained. For example, a set of sub-images retrieved according to the derived query "purple grape and banana" may not include images satisfying the derived query, for example, the set of sub-images may only include images rendering the green grape and the banana, and images rendering the banana. In this case, it can be determined that the derived query "purple grape and banana" includes two components <purple grape> and <banana>, and two decomposed derived queries can be constructed based on these two components, that is, a decomposed derived query "purple grape" and a decomposed derived query "banana". Next, two sets of additional sub-images respectively retrieved according to the two decomposed derived queries and respectively corresponding to the decomposed derived query "purple grape" and the decomposed derived query "banana" can be obtained.

It should be appreciated that if the set of sub-images retrieved according to the decomposed derived query still does not include an image satisfying the decomposed derived query, the decomposed derived query may be further decomposed until a set of sub-images retrieved according to the derived query includes an image satisfying the derived query or other stop conditions of the system are reached, the other stop conditions may be, for example, that a number of images satisfying the query among the first set of images retrieved according to the query and the second set of images generated based on the query has satisfied a predetermined threshold, or the like.

Three exemplary processes for generating an image based on a query are described above with reference to FIGS. 4-6. It should be appreciated that, in accordance with the embodiments of the present disclosure, any one or more of the three processes may be selected to generate an image, which may be based on a variety of factors, such as algorithm complexity, time cost, image quality, and the like. It should be also appreciated that the three processes described above for generating an image based on a query may be performed independently, alternately, or simultaneously, in accordance with the embodiments of the present disclosure.

In accordance with an embodiment of the present disclosure, when generating an image based on a query, the generating module may also change a background of the generated image or add a background thereto. In the field of image processing, a background refers to a scene of all areas of the image other than the foreground. Herein, a scene of an area other than objects on an image may be referred to as the background. In the case that a query includes an item indicating a background, the background of the image may be determined based on the item indicating the background. In some embodiments, the item indicating the background that the query includes may be determined through semantic analysis on the query. For example, for a query "bird at night", it can be determined that the query includes the item "night" indicating the background. In this case, a background rendering the night can be added to the generated image rendering a bird. In the case that a query does not include an item indicating a background, the generating module can determine a background that matches objects and attributes in the generated image based on a large amount of true training data. For example, for a query "camel", the query does not include an item indicating a background. Since the images rendering the camel included in the data used to train the generating module are mostly with the background of desert, the generating module can determine that the background rendering the desert is likely the background satisfying the query.

After the user enters a query for a image in an application such as a search engine, image search results associated with the query can be viewed in an user interface of the application. In accordance with an embodiment of the present disclosure, in addition to retrieving a first set of images according to the query, a second set of images generated based on the query may also be presented to the user as image search results. The user may want to modify one or more of these images. In accordance with an embodiment of the present disclosure, the user can obtain a modified image without calling other applications or software. For example, after selecting an image to be modified in the user interface of the search engine, the user can directly make a request for modifying the image via the user interface. The search engine can call the generative image acquisition apparatus in the background to make corresponding modifications. The modified image can be presented to the user via the user interface of the search engine. The user does not need to download and save the image to local and launch other image modification software to modify it.

In accordance with an embodiment of the present disclosure, the user can propose a modification request by using a natural language and in an interactive manner. For example, the user can input, with voice or text, a modification request such as "Can you change the background to blue?" or more directly, "Change the background to blue". In addition, for a particular image, the user can make a plurality of requests until the result of the modification is satisfactory.

In accordance with an embodiment of the present disclosure, in the process for generating a second set of images based on the query, it may also be determined that whether a number of images satisfying the query included in the generated second set of images and a first set of images retrieved according to a received query satisfies a predetermined threshold. The predetermined threshold may be, for example, predetermined by the system. If the number satisfies the predetermined threshold, the step for generating the second set of images may be stopped.

As described above, the process for generating an image based on a query in accordance with an embodiment of the present disclosure, such as the processes as shown in FIGS. 4, 5, and 6, can use images retrieved on the network as image elements to generate an image satisfying the query. In some aspects, the used image elements may be images that a service provider, such as a service provider that provides images to users, has licenses for.

Figure 7:
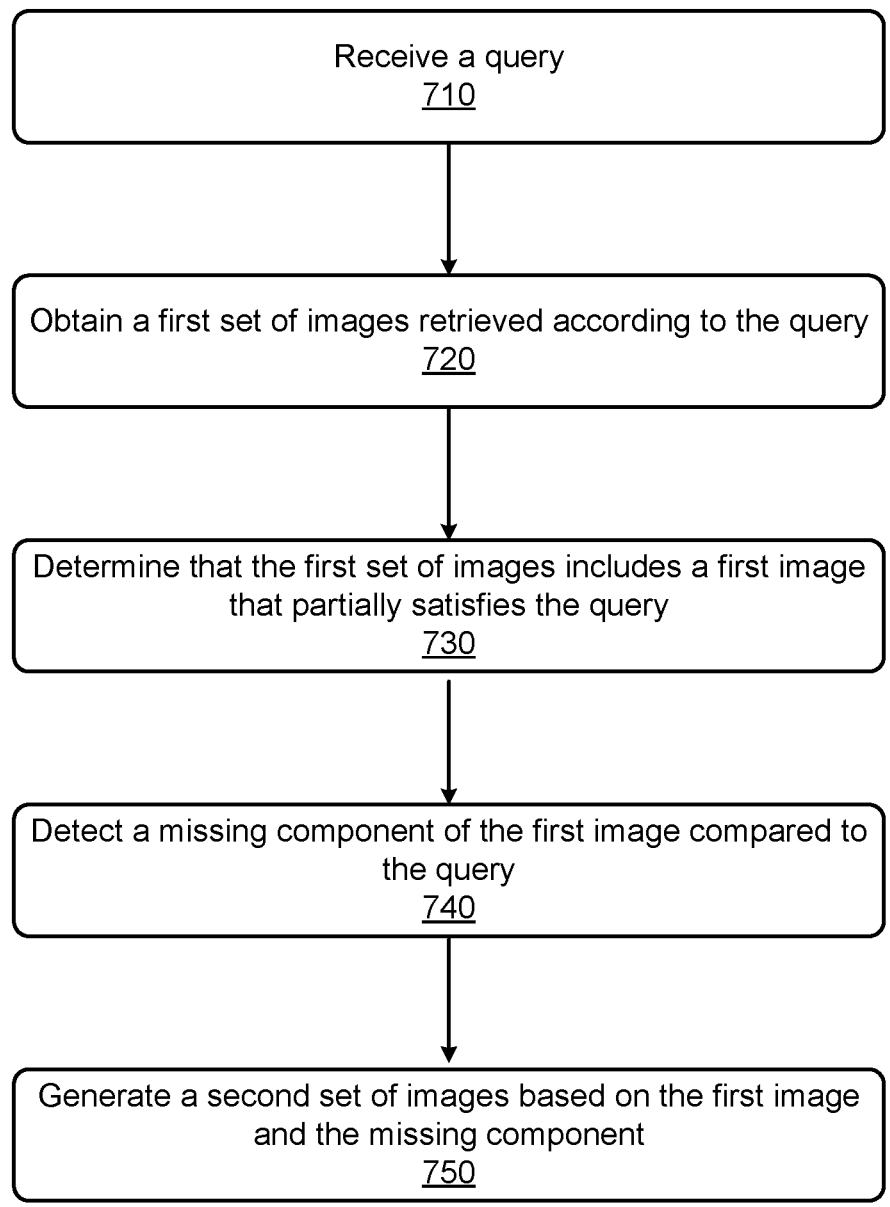
FIG. 7 is a flowchart of an exemplary method for generative image acquisition in accordance with an embodiment of the present disclosure.

FIG. 7 is a flowchart of an exemplary method 700 for generative image acquisition in accordance with an embodiment of the present disclosure.

At step 710, a query can be received.

At step 720, a first set of images retrieved according to the query can be obtained.

At step 730, it is can be determined that the first set of images includes a first image that partially satisfies the query.

At step 740, a missing component of the first image compared to the query can be detected.

At step 750, a second set of images based on the first image and the missing component can be generated.

In an implementation, the determining comprises: detecting a first set of components from the query; detecting a second set of components from the first image; and determining that the first image partially satisfies the query based on the second set of components not including all of the first set of components, wherein each component of the first set of components and the second set of components includes an object and/or an attribute associated with the object.

In an implementation, the detecting comprises detecting a component that is not included in a second set of components corresponding to the first image from a first set of components corresponding to the query, and wherein the generating comprises: generating a second image by modifying the first image based on the missing component; and adding the second image into the second set of images.

In an implementation, the detecting comprises detecting a component that is not included in a second set of components corresponding to the first image from a first set of components corresponding to the query, and wherein the generating comprises: constructing a derived query based on the missing component; obtaining a third set of images retrieved according to the derived query; selecting an additional image from the third set of images; combining the first image and the additional image into a second image; and adding the second image into the second set of images. In an implementation, wherein a matching degree of the additional image with the derived query satisfies a matching degree threshold.

In an implementation, the generating further comprises: determining that naturalness of the second image does not satisfy a naturalness threshold; and removing the second image.

In an implementation, the generating further comprises: determining that the second image partially satisfies the query; and updating the second image based at least on the query.

In an implementation, the method 700 further comprises: constructing a plurality of derived queries according to the query, wherein the query includes a first set of components, and the plurality of derived queries respectively includes one or more components of the first set of components; obtaining a plurality of sets of sub-images respectively retrieved according to the plurality of derived queries and respectively corresponding to the plurality of derived queries; selecting a plurality of sub-images respectively corresponding to the plurality of derived queries from the plurality of sets of sub-images; combining the selected plurality of sub-images into a second image; and adding the second image into the second set of images.

In an implementation, the obtaining the plurality of sets of sub-images comprises: determining that one set of sub-images of the plurality of sets of sub-images does not include a sub-image that satisfies a derived query corresponding to the set of sub-images; determining an attribute in a component included in the derived query; and modifying at least one of the set of sub-images based on the attribute to generate at least one updated sub-image that satisfies the derived query.

In an implementation, the obtaining the plurality of sets of sub-images comprises: determining that one set of sub-images of the plurality of sets of sub-images does not include a sub-image that satisfies a derived query corresponding to the set of sub-images; determining a plurality of components included in the derived query; constructing a plurality of decomposed derived queries according to the plurality of components included in the derived query; and obtaining a plurality of sets of additional sub-images respectively retrieved according to the plurality of decomposed derived queries and respectively corresponding to the plurality of decomposed derived queries.

In an implementation, the selecting comprises, for each set of sub-images of the plurality of sets of sub-images: selecting a sub-image satisfies a derived query corresponding to the set of sub-images.

In an implementation, the method 700 further comprises: receiving an input for modifying an image in at least a portion of the first set of images and the second set of images; modifying the image based on the input; and providing the modified image.

In an implementation, the method 700 further comprises: determining that a number of images included in the first set of images and the second set of images that satisfies the query meets a predetermined threshold; and stopping the generating step.

It should be appreciated that the method 700 may further comprise any steps/processes for generative image acquisition according to the embodiments of the present disclosure as mentioned above.

Figure 8:
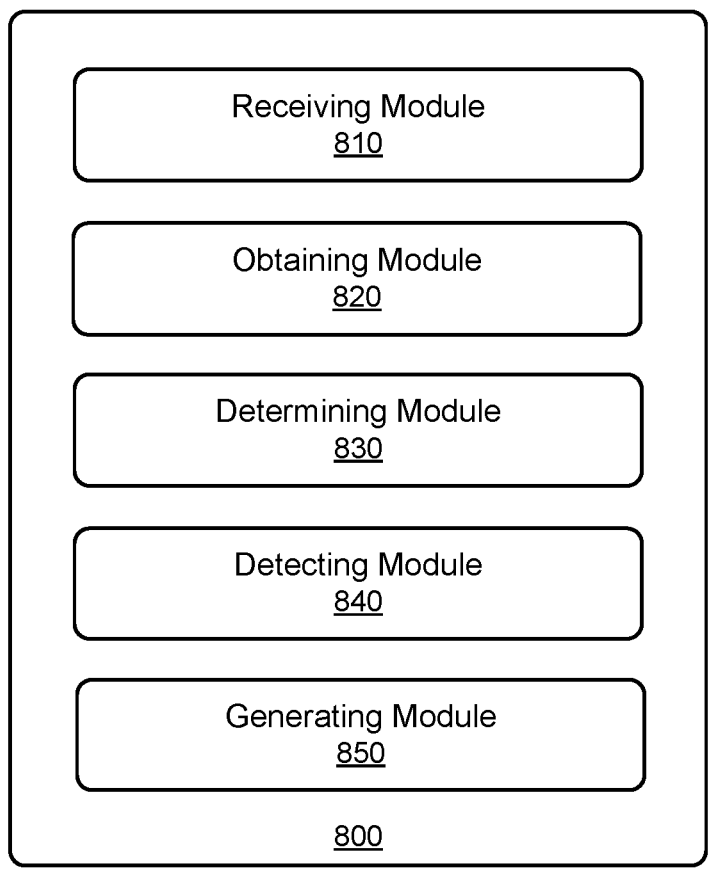
FIG. 8 illustrates an exemplary apparatus for generative image acquisition in accordance with an embodiment of the present disclosure.

FIG. 8 illustrates an exemplary apparatus 800 for generative image acquisition in accordance with an embodiment of the present disclosure. The apparatus 800 may comprise: a receiving module 810, for receiving a query; an obtaining module 820, for obtaining a first set of images retrieved according to the query; a determining module 830, for determining that the first set of images includes a first image that partially satisfies the query; a detecting module 840, for detecting a missing component of the first image compared to the query; and a generating module 850, for generating a second set of images based on the first image and the missing component.

In an implementation, the detecting module 840 is further configured for: detecting a component that is not included in a second set of components corresponding to the first image from a first set of components corresponding to the query, and wherein the generating module 850 is further configured for: generating a second image by modifying the first image based on the missing component; and adding the second image into the second set of images.

In an implementation, the detecting module 840 is further configured for: detecting a component that is not included in a second set of components corresponding to the first image from a first set of components corresponding to the query, and wherein the generating module 850 is further configured for: constructing a derived query based on the missing component; obtaining a third set of images retrieved according to the derived query; selecting an additional image from the third set of images; combining the first image and the additional image into a second image; and adding the second image into the second set of images.

In an implementation, the generating module 850 is further configured for: constructing a plurality of derived queries according to the query, wherein the query includes a first set of components, and the plurality of derived queries respectively includes one or more components of the first set of components; obtaining a plurality of sets of sub-images respectively retrieved according to the plurality of derived queries and respectively corresponding to the plurality of derived queries; selecting a plurality of sub-images respectively corresponding to the plurality of derived queries from the plurality of sets of sub-images; combining the selected plurality of sub-images into a second image; and adding the second image into the second set of images.

In an implementation, the obtaining the plurality of sets of sub-images comprises: determining that one set of sub-images of the plurality of sets of sub-images does not include a sub-image that satisfies a derived query corresponding to the set of sub-images; determining an attribute in a component included in the derived query; and modifying at least one of the set of sub-images based on the attribute to generate at least one updated sub-image that satisfies the derived query.

In an implementation, the obtaining the plurality of sets of sub-images comprises: determining that one set of sub-images of the plurality of sets of sub-images does not include a sub-image that satisfies a derived query corresponding to the set of sub-images; determining a plurality of components included in the derived query; constructing a plurality of decomposed derived queries according to the plurality of components included in the derived query; and obtaining a plurality of sets of additional sub-images respectively retrieved according to the plurality of decomposed derived queries and respectively corresponding to the plurality of decomposed derived queries.

Moreover, the apparatus 800 may further comprise any other modules configured for generative image acquisition according to the embodiments of the present disclosure as mentioned above.

Figure 9:
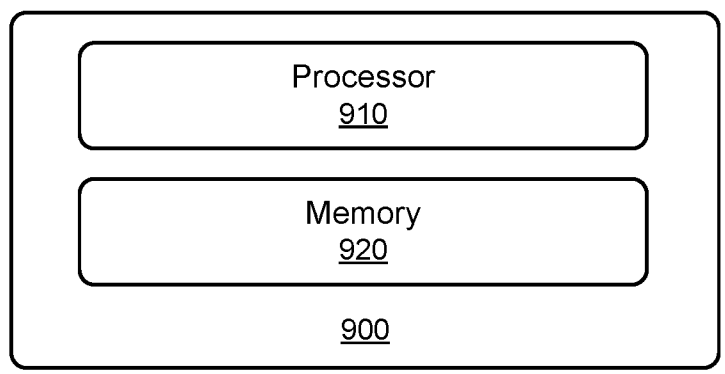
FIG. 9 illustrates an exemplary apparatus for generative image acquisition in accordance with an embodiment of the present disclosure.

FIG. 9 illustrates an exemplary apparatus 900 for generative image acquisition in accordance with an embodiment of the present disclosure.

The apparatus 900 may comprise at least one processor 910. The apparatus 900 may further comprise a memory 920 coupled with processor 910. The memory 920 may store computer-executable instructions that, when executed, cause processor 910 to perform any operations of the methods for generative image acquisition according to the embodiments of the present disclosure as mentioned above.

The embodiments of the present disclosure may be embodied in a non-transitory computer-readable medium. The non-transitory computer-readable medium may comprise instructions that, when executed, cause one or more processors to perform any operations of the methods for generative image acquisition according to the embodiments of the present disclosure as mentioned above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors are described in connection with various apparatus and methods. These processors can be implemented using electronic hardware, computer software, or any combination thereof. Whether these processors are implemented as hardware or software will depend on the specific application and the overall design constraints imposed on the system. By way of example, a processor, any portion of a processor, or any combination of processors presented in this disclosure may be implemented as a microprocessor, a microcontroller, a digital signal processor (DSP), a field programmable gate array (FPGA), a programmable logic device (PLD), state machine, gate logic, discrete hardware circuitry, and other suitable processing components configured to perform the various functions described in this disclosure. The functions of a processor, any portion of a processor, or any combination of processors presented in this disclosure may be implemented as software executed by a microprocessor, a microcontroller, a DSP, or other suitable platforms.

Software should be considered broadly to represent instructions, instruction sets, code, code segments, program code, programs, subroutines, software modules, applications, software applications, software packages, routines, subroutines, objects, running threads, processes, functions, and the like. Software can reside on computer readable medium. Computer readable medium may include, for example, a memory, which may be, for example, a magnetic storage device (e.g., a hard disk, a floppy disk, a magnetic strip), an optical disk, a smart card, a flash memory device, a random access memory (RAM), a read only memory (ROM), a programmable ROM (PROM), an erasable PROM (EPROM), an electrically erasable PROM (EEPROM), a register, or a removable disk. Although a memory is shown as being separate from the processor in various aspects presented in this disclosure, a memory may also be internal to the processor (e.g., a cache or a register).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skilled in the art are intended to be encompassed by the claims.

The invention claimed is:

1. A method for generative image acquisition, comprising:

receiving a query that specifies a first component and a second component relating to features of an image;

obtaining a first set of images retrieved according to the query;

determining that the first set of images has the first component and a third component, the third component being different from the second component, wherein the second component has an attribute and the third component has an attribute;

comparing the first set of images to the query;

determining that the second component is missing from the first set of images compared to the query thereby identifying the second component as a missing component;

modifying one of the first set of images to replace the third component with the second component to generate a second set of images based on the first set of images, the second set of images including the second component, wherein a generating module modifies the one of the first set of images by changing the third component attribute in the one of the first set of images to the second component attribute; and presenting the second set of images.

2. The method of claim 1, wherein each one of the first component, the second component, and the third component includes an object and/or an attribute associated with the object.

3. The method of claim 1, further comprising:

constructing a derived query based on the missing component;

obtaining a third set of images retrieved according to the derived query;

combining the first set of images and the third set of images; and adding the combined first and third sets of images into the second set of images.

4. The method of claim 3, wherein a matching degree of an additional image with the derived query satisfies a matching degree threshold.

5. The method of claim 1, further comprising:

determining that a number of images included in the first set of images and the second set of images that satisfies the query meets a predetermined threshold; and stopping the modifying.

6. An apparatus for generative image acquisition, comprising:

a receiving module for receiving a query that specifies a first component and a second component relating to features of an image;

an obtaining module for obtaining a first set of images retrieved according to the query;

a determining module for determining that the first set of images has the first component and a third component, the third component being different from the second component, wherein the second component has an attribute and the third component has an attribute;

a module for comparing the first set of images to the query;

a module for determining that the second component is missing from the first set of images compared to the query thereby identifying the second component as a missing component;

a generating module for modifying one of the first set of images to replace the third component with the second component to generate a second set of images based on the first set of images, the second set of images including the second component, wherein a generating module modifies the one of the first set of images by changing the third component attribute in the one of the first set of images to the second component attribute; and a module for presenting the second set of images.

7. An apparatus for generative image acquisition, comprising:

at least one processor; and a memory storing computer executable instructions that, when executed, cause the at least one processor to:

receiving a query that specifies a first component and a second component relating to features of an image;

obtaining a first set of images retrieved according to the query;

determining that the first set of images has the first component and a third component, the third component being different from the second component, wherein the second component has an attribute and the third component has an attribute;

comparing the first set of images to the query;

determining that the second component is missing from the first set of images compared to the query thereby identifying the second component as a missing component;

modifying one of the first set of images to replace the third component with the second component to generate a second set of images based on the first set of images, the second set of images including the second component, wherein a generating module modifies the one of the first set of images by changing the third component attribute in the one of the first set of images to the second component attribute; and presenting the second set of images.

* * * * *